United States Patent
Czyzewski et al.

(10) Patent No.: US 10,402,897 B1
(45) Date of Patent: Sep. 3, 2019

(54) METHOD AND SYSTEM FOR REDIRECTING A FINANCIAL TRANSACTION

(75) Inventors: Tad Czyzewski, Arlington, VA (US); Jeffrey J. Waldin, Great Falls, VA (US); Bill Biggins, Glen Allen, VA (US); Christopher R. Burks, Midlothian, VA (US); Vinod Shenai, Glen Allen, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 1472 days.

(21) Appl. No.: 11/954,471

(22) Filed: Dec. 12, 2007

(51) Int. Cl.
G06Q 40/00 (2012.01)
G06Q 40/02 (2012.01)

(52) U.S. Cl.
CPC ............. G06Q 40/02 (2013.01); G06Q 40/00 (2013.01)

(58) Field of Classification Search
CPC ...................................................... G06Q 40/00
USPC ...................................................... 705/39, 35
See application file for complete search history.

(56) References Cited

U.S. PATENT DOCUMENTS

| | | | |
|---|---|---|---|
| 5,220,501 A * | 6/1993 | Lawlor et al. | 705/40 |
| 5,748,737 A | 5/1998 | Dagger | |
| 6,805,287 B2 | 10/2004 | Bishop et al. | |
| 7,748,614 B2 * | 7/2010 | Brown | 235/379 |
| 2002/0059142 A1 * | 5/2002 | Krause et al. | 705/44 |
| 2003/0126075 A1 * | 7/2003 | Mascavage et al. | 705/39 |
| 2003/0182230 A1 * | 9/2003 | Pessin | 705/39 |
| 2005/0065877 A1 | 3/2005 | Cleary et al. | |
| 2005/0119969 A1 * | 6/2005 | Michelsen et al. | 705/39 |
| 2007/0055594 A1 | 3/2007 | Rivest | |
| 2008/0065532 A1 * | 3/2008 | De La Motte | 705/39 |

* cited by examiner

*Primary Examiner* — Kirsten S Apple
(74) *Attorney, Agent, or Firm* — Troutman Sanders LLP; Christopher J. Forstner; John A. Morrissett

(57) ABSTRACT

A system and method for redirecting a financial transaction from one account held by a customer at a first issuer to a second account held by the customer at a second issuer comprising receiving a customer request for redirection, identifying the second account to which transactions should be redirected, providing redirection information to a transaction entity, receiving terms for a financial transaction, and performing the financial transaction with respect to the second account.

26 Claims, 6 Drawing Sheets

FIG. 3

Redirection Table

| | 1 | 2 | 3 | 4 |
|---|---|---|---|---|
| Entry Number | 1 | | | |
| Customer Name | John Doe | | | |
| Customer Address | 11 Main Street | | | |
| Customer Phone Number | (123) 456-7890 | | | |
| Customer E-mail Address | doe@email.com | | | |
| Card Type | Credit (Rate Level 3) | | | |
| Region Identifier | Region 2 | | | |
| Old Account Number | 1234 1234 1234 1234 | | | |
| New Account Number | 5678 5678 5678 5678 | | | |
| Card Issuer | ABC Bank (567865) | | | |
| Old Account Expiration Date | 9/1/09 | | | |
| New Account Expiration Date | 9/1/10 | | | |
| Redirection Begin Time | 1/1/08 9:00 AM | | | |
| Redirection End Time | 1/1/09 9:00 AM | | | |
| Redirection Instructions | All | | | |

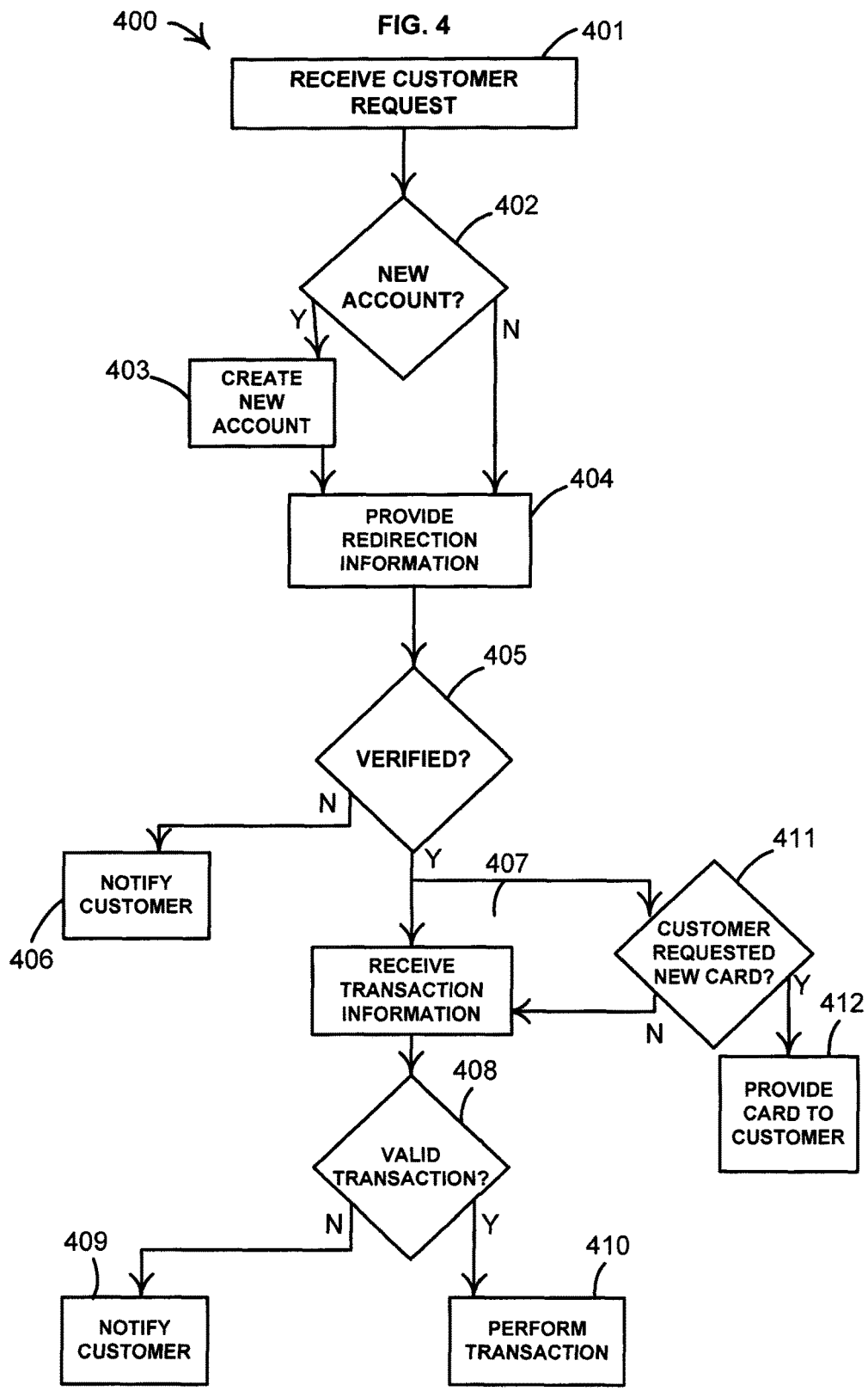

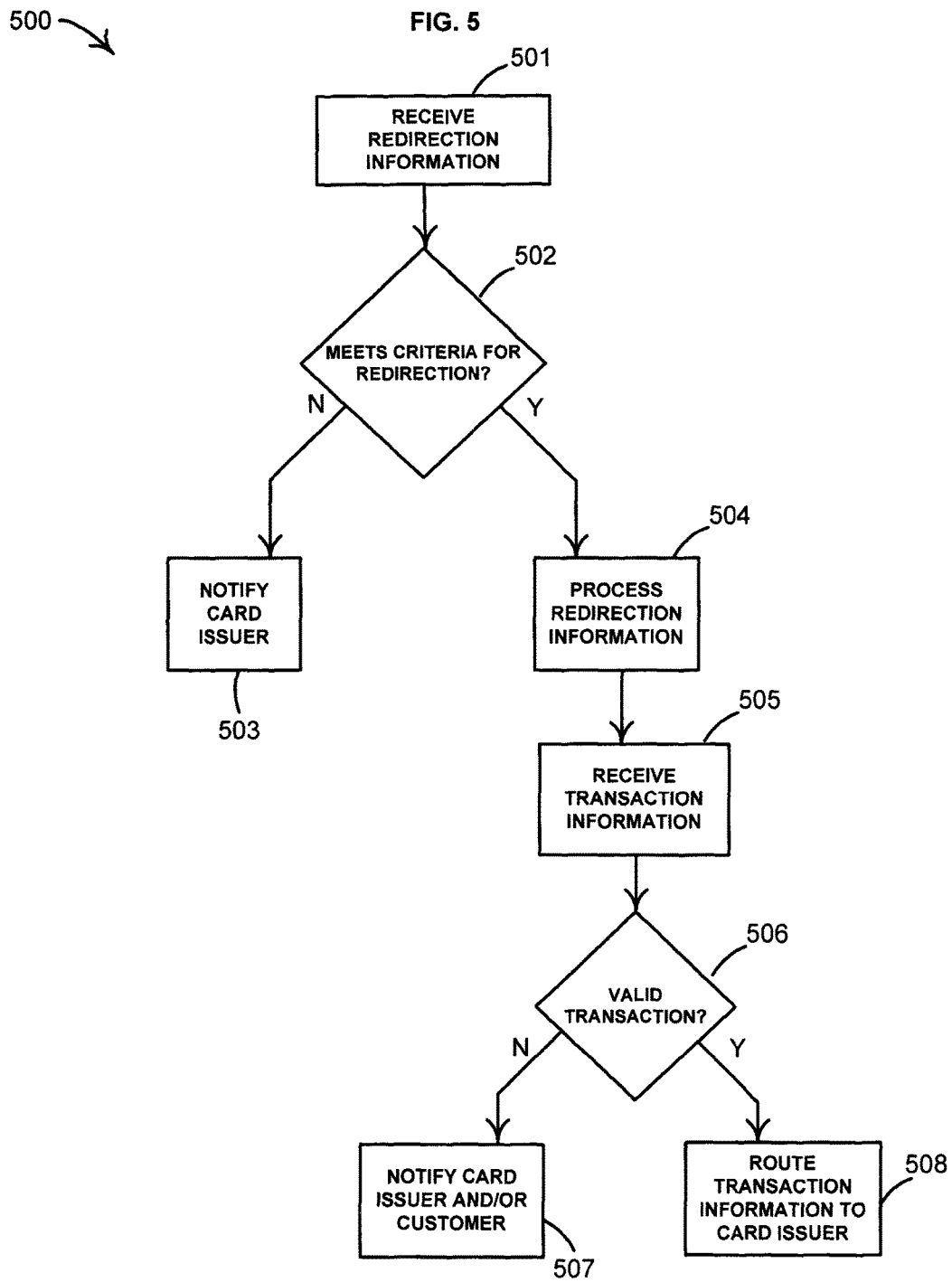

METHOD AND SYSTEM FOR REDIRECTING A FINANCIAL TRANSACTION

FIELD OF THE INVENTION

The present invention relates to a method and system for redirecting a financial transaction.

BACKGROUND OF THE INVENTION

Switching accounts is a currently accepted and performed practice by many individual customers and small businesses. For example, a customer may decide for various reasons that he or she wants to switch his or her current credit card to a new credit card offered by a particular card issuer. However, the customer may have to wait a considerable length of time for the card issuer to process the application and then for the new card to arrive in the mail before being able to take full advantage of the purchasing power of the new account. Also, the customer may have to take steps to change any recurring charges, direct billing, or automatic payments to and from the customer's old card to the customer's new card, which may be very time-consuming and cumbersome for the customer and may trigger various hidden costs. It may also be difficult for the customer to remember all of the entities that have the customer's old card on file, such as, for example, commercial web sites and retail store accounts. If the customer forgets a particular entity and a charge is made by that entity on the customer's old card, the customer may be billed a fee or suffer other adverse actions.

These and other drawbacks exist with current systems.

SUMMARY OF THE INVENTION

Various exemplary embodiments provide for redirecting a financial transaction. A customer may hold a first account at a first issuer but desire for some reason to switch to a second account at a second issuer. The customer may also not want to be bound to a new account number for the second account at the second issuer. The customer may, for example, desire that transactions initiated using the first account number be redirected so that they are performed with respect to the second account rather than the first account.

Various exemplary embodiments may provide a method for redirecting a financial transaction. A customer request for redirection may first be received and may comprise information for redirecting transactions from a first account to a second account. Information may also be provided to a transaction entity representing the customer's desire for a particular redirection. When a subsequent transaction is submitted for processing using, for example, an account number for the first account, the transaction may be redirected to the correct entity and performed with respect to the second account.

Various exemplary embodiments may also provide a system for redirecting a financial transaction including a request receipt module for receiving a customer request, an interface module for providing redirection information to a transaction entity, a transaction receipt module for receiving terms for a financial transaction, and a transaction processing module for performing the desired transaction with respect to the second account. Also, the system may include a redirection information receipt module for receiving redirection information, a transaction receipt module for receiving terms for a financial transaction, and an interface module for redirecting information for the desired transaction to the correct entity.

Other embodiments are also within the scope of the invention.

BRIEF DESCRIPTION OF THE DRAWINGS

The present invention, together with further objects and advantages, may best be understood by reference to the following description taken in conjunction with the accompanying drawings, in the several Figures of which like reference numerals identify like elements, and in which:

FIG. 3 depicts an exemplary table for use in redirecting a financial transaction according to various embodiments of the disclosure;

FIG. 4 depicts an exemplary flow chart which illustrates an exemplary method for redirecting a financial transaction according to various embodiments of the disclosure;

FIG. 5 depicts an exemplary flow chart which illustrates an exemplary method for redirecting a financial transaction according to various embodiments of the disclosure.

DETAILED DESCRIPTION OF EXEMPLARY EMBODIMENT(S)

The following description is intended to convey a thorough understanding of the embodiments described by providing a number of specific embodiments and details involving systems and methods for redirecting a financial transaction. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Various exemplary embodiments provide for redirecting a financial transaction.

It will be recognized by those skilled in the art that in at least some exemplary financial transactions (e.g., credit card transactions), there may be at least two phases: authorization and settlement. In the authorization phase, a merchant may perform various actions to find out whether a customer's desired transaction is valid (e.g., if the customer has sufficient funds in his or her account or sufficient credit available to make a particular purchase). If the transaction is valid, the merchant may receive payment for the transaction in the settlement phase (e.g., from the customer's card issuer). Each phase will be discussed in reference to FIG. 1.

Figure 1:
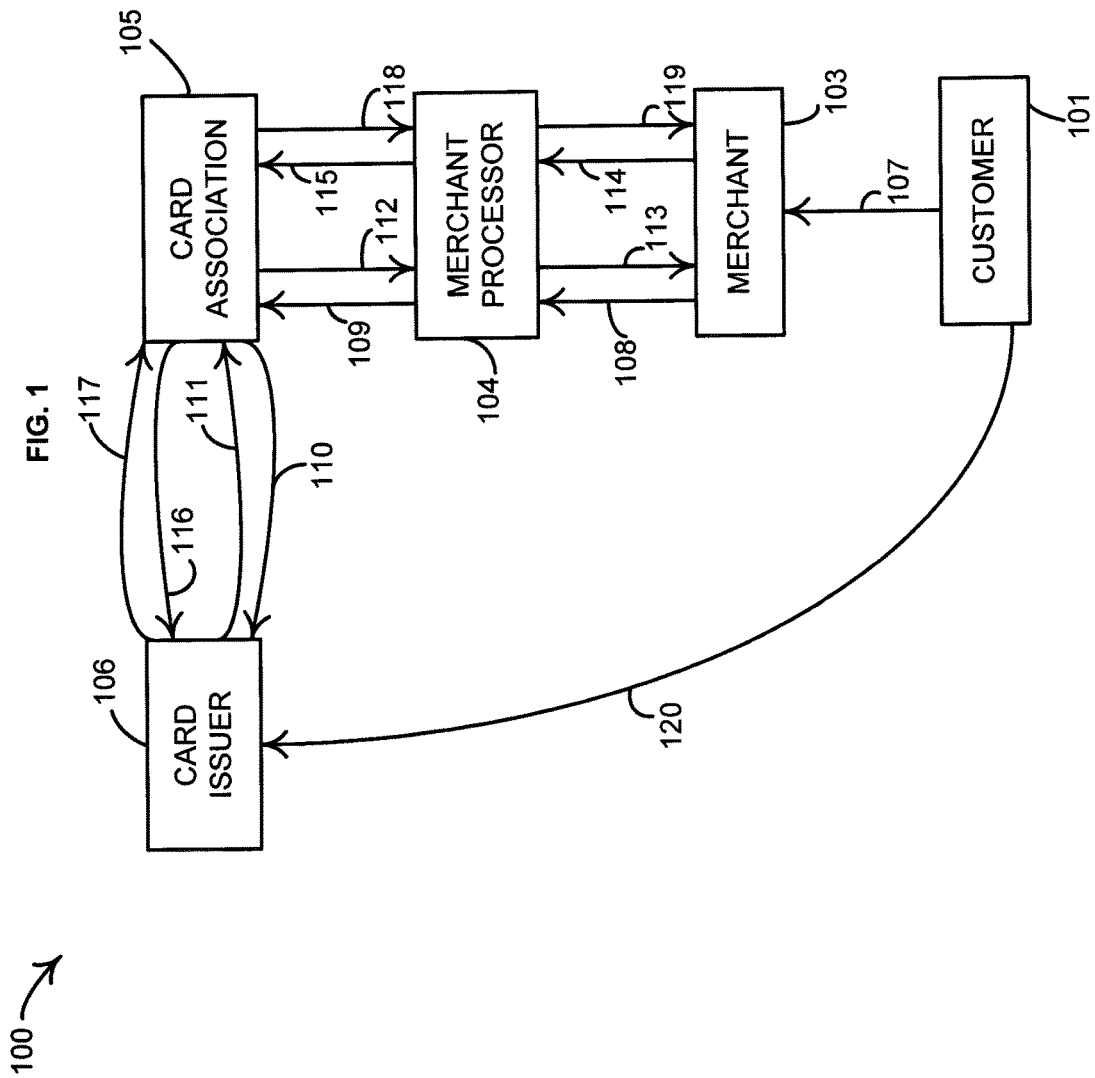
FIG. 1 depicts an exemplary embodiment of an exemplary transaction system for authorizing and settling a transaction according to various embodiments of the disclosure.

FIG. 1 depicts an exemplary embodiment of an exemplary transaction system 100 for authorizing and settling a transaction according to various embodiments of the disclosure. Exemplary card transaction system 100 may involve a customer 101, a merchant 103, a merchant processor 104, a card association 105, and/or a card issuer 106.

Exemplary card transaction system 100 may include one or more network-enabled computers to process instructions for authorizing and settling a financial transaction. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of exemplary card transaction system 100 may execute one or more software applications to, for example, receive data as input from an entity accessing the network-enabled computer, process received data, transmit data over a network, and receive data over a network. The one or more network-enabled computers may also include one or more software applications to enable the processing of a card transaction.

The components depicted in FIG. 1 may be coupled via one or more networks. As referred to herein, a network may include, but is not limited to: e.g., a wide area network (WAN), a local area network (LAN), a global network such as the Internet, a telephone network such as a public switch telephone network, a wireless communication network, a cellular network, an intranet, or the like, or any combination thereof. In exemplary embodiments, the network may include one, or any number of the exemplary types of networks mentioned above, operating as a stand alone network or in cooperation with each other. Use of the term network herein is not intended to limit the network to a single network. The components depicted in FIG. 1 may communicate by electronic transmission through the one or more networks mentioned above, by physical delivery, or by any other communication mechanism. Communication between two components depicted in FIG. 1 may also include communication with any other entities between the two components.

In various exemplary embodiments, the customer 101 may be any individual or entity that desires to conduct a financial transaction with the merchant 103. For example, the customer may desire to purchase goods or services from the merchant 103. The customer 101 may use a unique customer identifier to conduct the financial transaction with the merchant 103. The customer identifier may be any sequence of letters, numbers, characters, or symbols of any length and may be associated with a payment mechanism, including, without limitation, a credit card, debit card, smart card, charge card, or any other mechanism for making payment. The payment mechanism may be issued to the customer 101 by a card issuer 106, such as, for example, a bank where the customer 101 has an account, another financial institution, or any other entity. As used herein, the term account may include any place, location, object, entity, or other mechanism for holding money or performing monetary transactions in any form, including, without limitation, electronic form. An account may be, for example, a prepaid card account, stored value card account, debit card account, check card account, payroll card account, gift card account, prepaid credit card account, charge card account, checking account, rewards account, line of credit account, or credit account.

In just one example, the customer 101 may have a credit card that allows the customer 101 to make purchases on credit up to a specified dollar limit and repay the issuer 106 for those purchases over time by making monthly payments. The card issuer 106 may pay for the purchases of the customer 101 at the time of purchase on behalf of the customer 101 and charge the customer 101 interest for using its credit services. Also, the customer 101 may use a charge card wherein the balance of the customer's card may be paid off monthly. Also, the customer 101 may use a debit card wherein amounts for the purchases may be electronically debited from a checking or other account held by the customer at the card issuer 106.

The customer identifier of the customer 101 may also be associated with a card association 105, which may, for example, administer cards and act as a gateway between the merchant 103 from which the customer 101 desires to make a purchase and the card issuer 106 for processing card transactions. Exemplary card associations may include, without limitation, Visa® and MasterCard®.

In various exemplary embodiments, a merchant 103 may be any entity capable of accepting a customer identifier as payment. The merchant 103 may receive payments for the merchant's card transactions in various ways, such as a bank account held by the merchant 103. For example, the merchant 103 may establish a direct deposit account or checking account at a bank.

Authorization Phase:

As indicated by arrow 107, the customer 101 may provide the merchant 103 with his or her customer identifier to purchase desired goods or services or conduct another type of financial transaction. For example, and without limitation, the customer 101 may swipe his or her credit card in person at the location of the merchant 103 using a register, card payment terminal, or point of sale (POS) system, which may read the customer identifier from the magnetic stripe on the card. Also, the customer identifier may be provided via a bar code on the card. Also, the customer identifier may be provided via radio-frequency identification (RFID) or other automatic identification mechanisms. Various mechanisms for accepting a customer identifier as payment will be recognized by those skilled in the art, including, for example, transaction processing equipment and software provided by VeriFone, Inc. of San Jose, Calif. Also, the customer 101 may provide the merchant 103 with the customer identifier over the telephone or using a computer. For example, the customer 101 may make a purchase electronically by entering his or her customer identifier and/or other information associated with the desired purchase on the World Wide Web (WWW) site of the merchant 103, a site accessible via a network, or any other site accessible by a communication mechanism. Various mechanisms for conducting online transactions will be recognized by those skilled in the art. The customer 101 may also make a purchase electronically using various payment services, such as, for example, PayPal®.

After receiving the customer identifier from the customer 101, the merchant 103 may begin the process of authorizing the desired transaction by providing an authorization request to the merchant processor 104, as indicated by arrow 108. The authorization request may include, for example, information associated with the amount of the desired transaction, the customer identifier of the customer 101, and/or any other information associated with the customer 101 or the transaction. In various exemplary embodiments, the merchant 103 may transmit the authorization request to the merchant processor 104 electronically over one or more networks.

In various exemplary embodiments, the merchant processor 104 may have a predefined relationship, agreement, or arrangement with the merchant 103 to authorize and settle card transactions on behalf of the merchant 103. The merchant processor 104 may process transactions for a plurality of merchants and a plurality of customers. For example, TSYS Acquiring Solutions, LLC (TSYS), which those skilled in the art will recognize as an entity that authorizes and settles card transactions, may operate as the merchant processor 104.

As indicated by arrow 109, the merchant processor 104 may provide the authorization request, or any other authorization data, to a card association 105 associated with the customer identifier of the customer 101. For example, if the customer 101 attempted to pay for a purchase with a Visa® credit card, the authorization request may be routed to Visa®. If the customer 101 attempted to pay for a purchase with a MasterCard® credit card, the authorization request may be routed to MasterCard®. The card association 105 may perform various actions to verify that the desired transaction may be completed, including, for example, verifying that there may not have been a temporary or permanent hold placed on the card or verifying that one or more predetermined fraud parameters may not have been triggered. In just one example, the card association 105 may verify that the amount of the desired transaction is not unusually large based on the customer's recent purchases.

As indicated by arrow 110, the card association 105 may provide the authorization request, or any other authorization data, such as, for example, information associated with verification of the customer 101 or transaction, as described herein, to the card issuer 106 that issued the card to the customer 101. For example, if the customer 101 obtained his or her card from a bank, that bank may act as the card issuer 106. The card issuer 106 may perform various actions to verify that the desired transaction may be completed, including, for example, verifying that the customer identifier is valid and/or verifying that the desired purchase is within the credit or debit limit available to the customer 101. The card issuer 106 may create an authorization message, which may, for example, approve or deny the desired transaction. The authorization message may eventually be routed back to the merchant 103, as described herein.

As indicated by arrow 111, the card issuer 106 may provide the authorization message to the card association 105. As indicated by arrow 112, the card association 105 may provide the authorization message, or any other authorization data, to the merchant processor 104. In various exemplary embodiments, an entity may operate as both the card association 105 and card issuer 106. The merchant processor 104 in that situation may route the authorization request to the combined entity and the combined entity may provide the authorization message to the merchant processor 104. Also, the card association 105 itself may operate as the card issuer 106, as described herein. The merchant processor 104 in that situation may route the authorization request to the card association 105 and the card association 105 may provide the authorization message to the merchant processor 104.

As indicated by arrow 113, the merchant processor 104 may provide the authorization message, or any other authorization data, to the merchant 103. If the transaction was denied, the merchant 103 may deny the desired transaction and, for example, refuse to provide the customer 101 with his or her desired goods or services. If the transaction was approved, the merchant 103 may complete the transaction by, for example, receiving the customer's written signature on a receipt, providing the desired goods or services to the customer 101, and/or storing information associated with the transaction for later settlement. For example, the merchant 103 may store information electronically in a batch file. It is well-known in the art that electronic files may be stored in various ways, including, without limitation, a batch file, flat file, indexed file, hierarchical database, relational database, Microsoft® Excel file, Microsoft® Access file, or any other storage mechanism.

Settlement Phase:

During the settlement phase, the merchant 103 may receive payment for one or more card transactions, such as purchases of goods and services that the merchant 103 provided to its customers. In various exemplary embodiments, the merchant 103 may accumulate transactions until a predetermined threshold has been reached, such as, for example, a predetermined total amount or predetermined period of time (e.g., at the end of each business day), before proceeding with settlement. The merchant 103 may store information associated with each transaction in one or more batch files for later settlement at the predetermined time.

In various exemplary embodiments, the merchant 103 may provide a batch file representing all of the accumulated transactions to be settled at that time to the merchant processor 104, as indicated by arrow 114. For example, a transmission may occur when a predetermined threshold is reached. The merchant processor 104 may use the information in the batch file to create one or more batch files each containing transactions associated with a respective card association 105. For example, the merchant processor 104 may create a batch file for all Visa® credit card transactions from a plurality of merchants and transmit that batch file to Visa® as the card association 105. As indicated by arrow 115, the merchant processor 104 may provide the batch file to the respective card association 105. The card association 105 may in turn use the batch file to create one or more batch files each containing transactions associated with a respective card issuer 106. For example, Visa® may create a batch file for all transactions involving Visa® credit cards issued by a particular bank from a plurality of merchant processors and transmit that batch file to the bank as the card issuer 106. As indicated by arrow 116, the card association 105 may provide the batch file to the respective card issuer 106.

It should be recognized that although only one card association 105 and one card issuer 106 are shown in FIG. 1, the merchant processor 104 may provide a plurality of batch files to a plurality of respective card associations and the plurality of card associations may provide a plurality of batch files to a plurality of respective card issuers, as discussed herein.

As indicated by arrow 117, the card issuer 106 may respond by routing funds for the transactions contained in a respective batch file to the respective card association 105. As indicated by arrow 118, the card association 105 may relay the funds to the merchant processor 104 or, for example, combine them with any other funds before providing them to the merchant processor 104. In various exemplary embodiments, as indicated by arrow 119, the merchant processor 104 may route the funds to the merchant 103 by, for example, depositing the funds into an account held on behalf of the merchant 103. For example, the merchant processor 104 may route funds electronically via a funds file through the Automated Clearing House (ACH) Network. Also, the card issuer 106 and/or card association 105 may route funds for the associated transactions directly to an account held on behalf of the merchant 103 rather than routing the funds through the other entities depicted in FIG. 1.

As indicated by arrow 120, the customer 101 may pay the card issuer 106 associated with his or her customer identifier for the transactions that the customer 101 makes. For example, the customer 101 may pay a monthly bill to the card issuer 106 and may choose to pay the full amount or only a partial amount of the bill. In various exemplary embodiments, the card issuer 106 may charge the customer 101 interest on any unpaid portion of a bill.

In various exemplary embodiments, the entities described in reference to exemplary card transaction system 100, such as, for example, the merchant processor 104, card association 105, and card issuer 106, may charge various entities a fee for using their services. For example, the merchant processor 104 may charge the merchant 103 a predetermined percentage for each transaction (e.g., 2%) and reduce the amount paid to the merchant 103 accordingly. As just one example, if a customer 101 purchases a product for $100, the merchant 103 may receive $98 in its account and the merchant processor 104 may receive $2. The merchant processor 104 may also, for example, pay the card association 105 and/or card issuer 106 for using their services (e.g., 1.4% interchange fee). Also, any of the entities described in reference to exemplary card transaction system 100 may charge a fee to any other entity for communicating or routing funds through the charging entity via a network.

Figure 2:
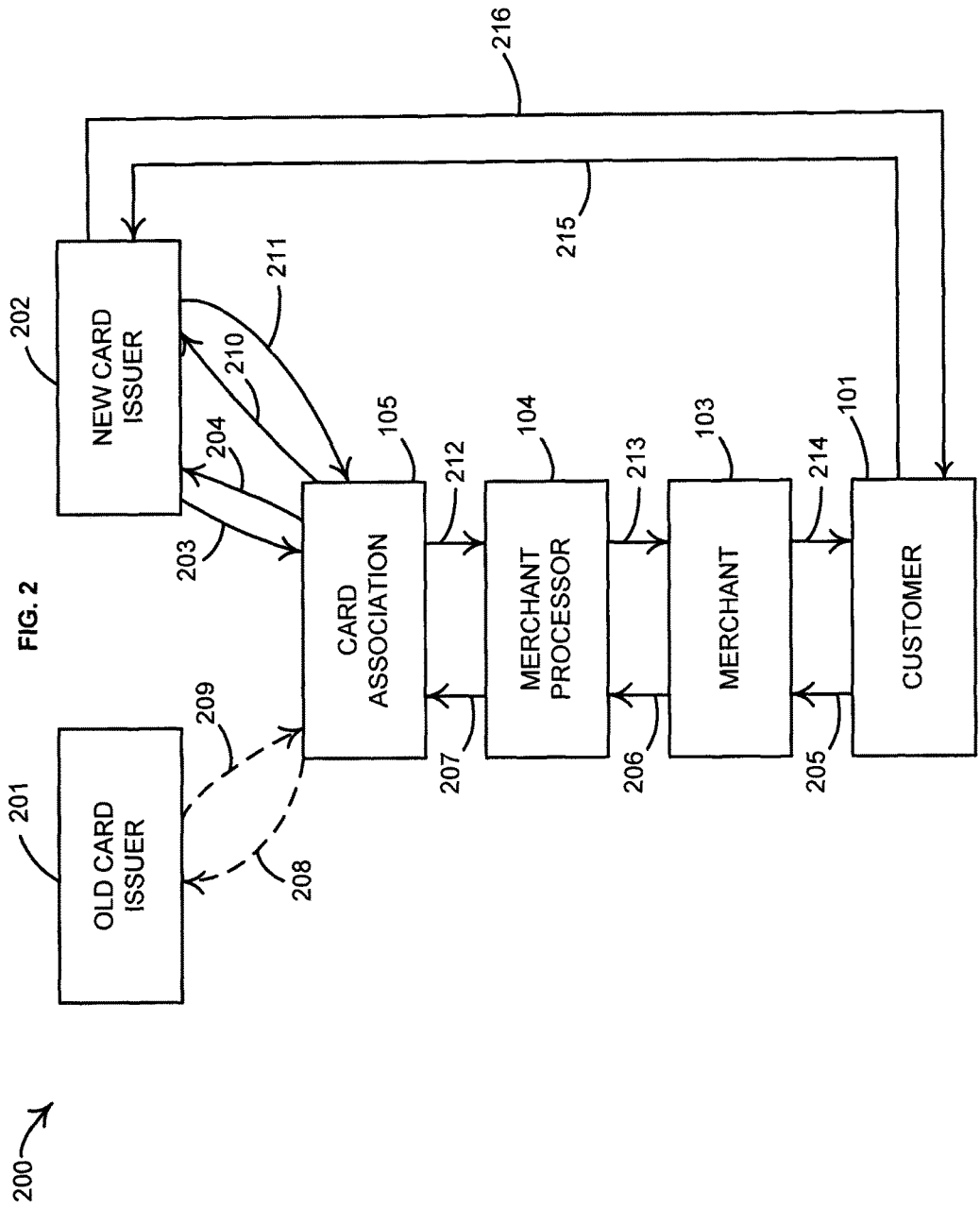
FIG. 2 depicts a schematic of an exemplary flow of data for redirecting a financial transaction according to various embodiments of the disclosure.

FIG. 2 depicts a schematic of an exemplary flow of data for redirecting a financial transaction according to various embodiments of the disclosure. Exemplary redirection system 200 may include one or more network-enabled computers to process instructions for redirecting a financial transaction, and the components depicted in FIG. 2 may be coupled via one or more networks, as described herein. Exemplary redirection system may involve the customer 101, merchant 103, merchant processor 104, card association 105, a first card issuer 201, and a second card issuer 202.

As described herein, in both the authorization and settlement phases of an exemplary financial transaction, the card association 105 may determine what information it may send to what entities, and, vice versa, from what entities it may receive what information. For example, in the authorization phase, if the card association 105 receives an authorization request for a transaction involving a card issued by Bank A, it may provide the authorization request to (and receive a return authorization message from) Bank A. In the settlement phase, the card association 105 may create a batch file for all incoming transactions involving cards issued by Bank B, send that batch file to Bank B, and then receive funds from Bank B to be routed to respective merchants.

The card association 105 may determine the correct card issuer to send information to and receive information from in various ways. For example, as will be understood by those of ordinary skill in the art, the first six digits of a card number, e.g., a "Bank Identification Number" (BIN), may be used to identify a particular card issuer. Any remaining digits of the card number may then be used to identify the particular account associated with the card or other feature. The card association 105, or any other entity depicted in FIG. 2, may electronically store a set of BINs in a storage mechanism with instructions for sending information or routing funds to and from any entity associated with a respective BIN. For example, if the first six digits of a card number involved in an incoming transaction are 123456, the card association 105 may in the authorization phase provide an authorization request to the entity associated with BIN 123456.

In reference to FIG. 2, the customer 101 may hold an account with the old card issuer 201, such as a credit card with an associated account number, but may desire for any reason to switch that account to a new account with the new card issuer 202. For example, the new card issuer 202 may offer new customers a credit card with a lower interest rate, lower annual fee, or higher credit limit. The second card issuer 202 may also offer an account with rewards or incentives for using a card in certain ways (e.g., airline miles for every dollar charged to the card). It will be recognized by those of ordinary skill in the art that there may be many reasons why a particular account or card may be better for a particular customer.

At the same time, however, the customer 101 may not want to have to use a new account number for the new account at the new card issuer 202. Instead, the customer 101 may desire to use his or her old account number (i.e., the account number associated with the old account at the old card issuer 201) for the new account. For example, the customer 101 may have memorized the old account number over time. Also, the customer 101 may have established an automatic transaction, such as a recurring charge, direct bill, direct deposit, or automatic payment to or from the old account, that the customer 101 may not want to change. For example, the customer 101 may have established a direct deposit to the old account for his or her paychecks, automatic student loan payments to a lender, or automatic bill payments from the old account to a utility provider, telephone service provider, or toll transponder service. As will be understood by those of ordinary skill in the art, the customer 101 may set up automatic transactions in various ways, including in person at the old card issuer 201, through a web site provided by a billing entity, or over the telephone.

To allow the customer 101 to use his or her old account number for the new account, the customer 101 may first submit to the new card issuer 202 a request to redirect transactions from his or her old account at the old card issuer 201 to a new account at the new card issuer 202, as indicated by arrow 215. For example, the customer 101 may communicate with the new card issuer 202 (or any other entity in the exemplary redirection system 200) by telephone, by mail, by electronic transmission at a retail location, or by electronic transmission from a computer. The customer 101 may also execute a web browser program on a computer to connect to a server of the new card issuer 202 (e.g., via the Internet) and request the Uniform Resource Locator (URL) of a web page from the server. The server may receive the customer's request, process the request, retrieve or create the requested web page, and transmit the requested web page to the computer of the customer 101. The customer's web browser program may then receive the web page and render it on the customer's computer screen. The customer may interact with the web page by, for example, clicking on buttons or activating links associated with the web page or entering information with a keyboard. The web browser may interpret this interaction and send information to the server for redirecting transactions as instructed by the customer 101. Examples of commercial web browser programs suitable for this purpose are Internet Explorer available from Microsoft® Corporation, Netscape Navigator available from Netscape® Communications, Safari® available from Apple®, Inc., and Firefox® available from Mozilla Corporation.

In various exemplary embodiments, the request submitted by the customer 101 may comprise information for redirecting transactions in the future from the old account to the new account. In various exemplary embodiments, the request may comprise the old account number, the type of card (if any) associated with the old account (e.g., credit card, debit card), identifying information for the customer 101 (e.g., name, address, telephone number, e-mail address), a time and date to begin redirecting transactions (e.g., an effective date), a time and date to end redirecting transactions (e.g., a termination date), a list of what transactions should be redirected, a new account number (if already established), and any other instructions to allow the new card issuer 202 to redirect transactions as desired by the customer 101. Also, the customer may specifically identify particular types of transactions (e.g., purchases, direct deposits), amounts of transactions (e.g., all transactions less than $100), or dates for transactions (e.g., all transactions occurring in the first two weeks of the month) to be redirected. As indicated by arrow 216, the new card issuer 202 may in response provide to the customer 101 (e.g., by mail or web page) an acknowledgement that transactions will be redirected in the future, or may request any further information necessary for performing the desired redirection. The card issuer 202 may also ensure the customer's security by, for example, requiring the customer to authenticate himself or herself (e.g., with a username and password) or sign a written document prior to approving a redirection request. It will also be understood that any type of financial transaction may be configured for redirection, including a purchase, charge, cash advance, cash withdrawal, loan, payment, bill payment, debit, credit, deposit, or direct deposit.

It will be understood that the customer 101 may make a request to the new card issuer 202 to redirect transactions whether or not he or she already has an account established at the new card issuer 202. If the customer 101 has already established an account at the new card issuer 202 to which he or she would like transactions redirected in the future, the customer 101 may instruct the new card issuer 202 accordingly by providing that information, such as the number for the account. If the customer 101 does not already have an account at the new card issuer 202, however, he or she may request that a new account be established to which transactions may be redirected in the future. The card issuer 202 may then create the account for the customer 101 and begin redirection, as described herein. It will also be understood that an account need not be identified with an account number and may be associated with any identifier, as described herein.

In various exemplary embodiments, once the customer 101 has instructed the new card issuer 202 that he or she desires to have transactions redirected from the old account to the new account, the new card issuer 202 may pass along instructions to the card association 105 in various ways, as indicated by arrow 203. For example, the new card issuer 202 may provide an electronic message through the one or more networks described herein, post electronic data to an electronic bulletin board or shared network location, post electronic data to a web site operated by the card association 105, physically deliver the instructions (e.g., by mail), provide the instructions via the telephone, or provide the instructions via any other communication mechanism. The new card issuer 202 may provide the information to the card association 105 whenever a customer submits a request, or the new card issuer 202 may aggregate requests from its customers and provide information for the customers to the card association 105 collectively at periodic time intervals. For example, the new card issuer 202 may provide a daily batch file containing information for all pending redirection requests for its customers. The information sent to the card association 105 may comprise any information that can be used to redirect a transaction from one account to another (e.g., old account number, new account number, time period for redirection), including, for example, the information provided by the customer 101 at arrow 215. As indicated by arrow 204, the card association 105 may process the information received and provide an acknowledgement to the new card issuer 202 that transactions will be redirected in the future, or may request any further information necessary for performing the redirection.

It will be understood that redirection need not occur at the card association 105 and may occur at the merchant 103, merchant processor 104, or any other entity involved in processing a particular transaction. In that case, the new card issuer 202 may provide information, as described herein, to that entity so that the entity can redirect information to a new recipient instead of the old recipient, or pass along the information for subsequent redirection.

In reference to FIGS. 2 and 3, an exemplary redirected transaction may proceed as follows. As indicated by arrow 205, the customer 101 may purchase goods or services from the merchant 103 using a Visa® credit card (or any other type of card) with an associated old account number 1234 1234 1234 1234 (or any other identifier). The merchant 103 may then begin the process of authorizing the transaction by providing an authorization request with the old account number to the merchant processor 104, as indicated by arrow 206. The merchant processor 104 may then provide the authorization request to the card association 105 Visa®, as indicated by arrow 207. Previously, the card association 105 may have provided the authorization request to the old card issuer 201, as indicated by arrow 208, and received a return authorization message from the old card issuer 201 approving or denying the transaction, as indicated by arrow 209.

However, because the customer 101 has instructed that his or her transactions using the old account number be instead performed with respect to a new credit card account at the new card issuer 202, the card association 105 may proceed with authorization (and settlement) differently. For example, FIG. 3 depicts an exemplary table for use in redirecting a financial transaction according to various embodiments of the disclosure. In reference to FIG. 3, the card association 105 may have received a request for redirection of transactions from the customer's old account number 1234 1234 1234 1234 to the customer's new account number 5678 5678 5678 5678, which may be associated with his or her new account at the card issuer ABC Bank (BIN 567865). As shown in FIG. 3, the table may cross reference the two account numbers together in a single entry. The customer 101 may also have requested that redirection begin on Jan. 1, 2008 at 9:00 AM and end on Jan. 1, 2009 at 9:00 AM. Also, the customer 101 may have requested that all transactions with respect to the old account number be redirected (rather than particular types of transactions, transaction amounts, or transaction dates). The card association 105 may have received this information from the new card issuer 202 and populated a redirection table 300, which may be stored electronically in a database, in reference to FIG. 3. The redirection table 300 may comprise entries 317-320 for particular redirection requests, wherein each is given an entry number 302. For example, entry 317 may correspond to the request of the customer 101. Each entry may comprise information associated with a redirection request, such as customer name 303, customer address 304, customer phone number 305, customer e-mail address 306, card type 307, region identifier 308, old account number 309, new account number 310, card issuer 311, old account expiration date 312, new account expiration date 313, redirection begin time 314, redirection end time 315, and redirection instructions 316. As described herein, the information stored in each entry may be used to perform the redirection from one account to another or may, for example, be used to contact a customer, issuer, or other entity in the event of a problem. It will also be recognized that information associated with a redirection request may be stored in any storage mechanism, in addition to the table in an electronic database described in reference to FIG. 3.

In various exemplary embodiments, the new card issuer 202 may provide information to the card association 105 for addition to any existing tables in an electronic database that the card association 105 may already use. In just one example, the card association 105 may already use a table of account numbers to inform entities when a particular card has been flagged, cancelled, or changed due to potential fraudulent activity. When a customer alerts a card association 105 (e.g., Visa® or MasterCard®) that his or her credit card was stolen, for example, the card association 105 may include the credit card number in a table and warn other entities, such as merchants and merchant processors, that the credit card number has been flagged by allowing them to access the table's contents in various ways described herein. In that way, a merchant may deny a transaction involving a card that has been suspended due to fraud or other reasons.

Also, the card association 105 may already use a table for account updates. For example, the card association 105 may update a table of account numbers whenever the expiration date of a customer's card is changed or whenever the BIN associated with a card issued by a particular card issuer is changed. In that way, other entities like merchants and merchant processors may look up information and charge transactions to the appropriate BIN associated with the card issuer that issued the customer's card.

In various exemplary embodiments, the new card issuer 102 may send information for a particular redirection to the card association 105 in the specific format or arrangement, or via the specific interface or other communication mechanism, that the card association 105 already uses for account updates. In that way, transactions may be redirected from an old account at the old card issuer 201 to a new account at the new card issuer 202 using the already existing infrastructure of the card association 105.

Returning to FIG. 2, the card association 105 may recognize (via the redirection table 300) that the old account number used for the incoming transaction is subject to redirection to a new credit card account at the new card issuer 202 ABC Bank. The card association 105 may then provide the authorization request to the new card issuer 202, as indicated by arrow 210, rather than providing the authorization request to the old card issuer 201. The new card issuer 202 may perform various actions to verify that the desired transaction may be performed with respect to the new account held by the customer 101. For example, the new card issuer 202 may verify the identity of the customer 101 and verify that the customer 101 has sufficient credit left in the new account to complete the desired transaction. The new card issuer 202 may create an authorization message approving or denying the transaction and provide the authorization message to the card association 105, as indicated by arrow 211. The card association 105 may in turn provide the authorization message to the merchant processor 104, as indicated by arrow 212, which may in turn provide the authorization message to the merchant 103, as indicated by arrow 213. The merchant 103 may then approve or deny the desired transaction with the customer 101 depending on the contents of the authorization message, as indicated by arrow 214.

The settlement phase of the exemplary transaction described above may operate similarly. For example, the card association 105 may submit a batch file to the new card issuer 202 (rather than the old card issuer 201) for all transactions to be redirected to accounts at the new card issuer 202, as well as all transactions involving cards issued by the new card issuer 202 that have not been redirected. The card association 105 may then receive funds from the new card issuer 202 (rather than the old card issuer 201) for routing to the merchant 103. For example, for a particular debit card transaction involving the customer 101, funds for paying the merchant 103 may be withdrawn from a checking account held by the customer 101 at the new card issuer 202 (rather than another checking account held at the old card issuer 201), even though the customer 101 may have used the account number associated with his or her old checking account to complete the transaction. Also, for a particular credit card transaction involving the customer 101, the new card issuer 202 (rather than the old card issuer 201) may pay the merchant 103 for a purchase and charge the customer 101 interest if the customer 101 does not pay his or her bill on time.

It will be understood that although a Visa® credit card with a particular associated account number and a new Visa® credit card with a different particular associated account number have been described in various exemplary embodiments above, any type of accounts, cards, and identifiers may be used, as described herein.

FIG. 4 depicts an exemplary flow chart 400 which illustrates an exemplary method for redirecting a financial transaction according to various embodiments of the disclosure. At block 401, a customer may submit a request to a card issuer to redirect transactions from one account to another. As described herein, the request may comprise an account number associated with an account held by the customer at another card issuer. At block 402, the card issuer may determine whether the customer has requested that a new account be created at the card issuer. If so, the card issuer may create the new account at block 403 as requested by the customer and may or may not notify the customer of a new account number associated with the new account. Once the new account is created, or if the customer requested redirection to an already existing account (e.g., by providing both an old account number from which transactions should be redirected and a new account number to which transactions should be redirected), the card issuer at block 404 may provide information for redirecting transactions to a card association (or a merchant processor, merchant, or any other entity involved in processing financial transactions), as described herein. At block 405, the card issuer may receive an acknowledgement from the card association as to whether the information was accepted. If the information was not accepted for any reason (e.g., the card issuer provided an account number not handled by that particular card association), the card issuer may at block 406 notify the customer that his or her request for redirection could not be completed, along with the reason(s) why. Notification may be accomplished in any way, including, for example, a written document, notification on a web page, electronic message, telephone message, e-mail, text message, instant message, or any other notification mechanism.

The card issuer may then, in parallel and at the same time as other processing (e.g., waiting for a transaction to be submitted for authorization or settlement) determine at block 411 whether the customer requested a new card associated with the account to which transactions should be redirected (e.g., by submitting a request with the original request for redirection). If so, the card issuer may at block 412 provide the card to the customer. As described herein, the customer need not wait until he or she receives the new card, which may take a considerable length of time, to begin making purchases or performing other transactions (e.g., automatic bill payments). Rather, transactions may be redirected to the new account immediately once the card issuer provides the information to the card association. Also, the new card may be associated with or display the old account number and/or the new account number. Also, in various exemplary embodiments, the customer may choose his or her own new account number, within any parameters set by the card issuer (e.g., the number must be 16 digits).

If the redirection information provided by the card issuer was accepted, the card issuer may then at some point in time at block 407 receive information associated with a transaction that the card association redirected to the card issuer. For example, the customer may make a purchase online using his or her old account number, or a recurring charge with respect to the old account number may be made, which is then submitted for authorization. The card association may determine that the transaction should be routed to the new card issuer and provide an authorization request for the desired transaction, which is received by the card issuer at block 407. A similar process may occur for the settlement phase of a transaction, as described herein. If the customer did not request a new card, the card issuer may also proceed from block 411 directly to block 407.

The card issuer may at block 408 determine whether the customer's desired transaction is valid. For example, the card issuer may determine whether there is enough money in the customer's checking account for a debit card purchase, or may determine whether the customer has sufficient credit available for a credit card purchase. The card issuer may use an account number associated with the customer's new account held at the card issuer to do so. If the transaction is not determined to be valid for any reason, the card issuer may notify the customer at block 409 in any of the ways described herein. If the transaction is determined to be valid, the card issuer may perform the transaction at block 410 and then await the receipt of additional transaction information (e.g., the next purchase made by the customer). Performing the transaction at block 410 may include, for example, returning an authorization message (e.g., approve or deny) to the card association or routing funds out of or into the customer's account at the card issuer.

FIG. 5 depicts an exemplary flow chart 500 which illustrates an exemplary method for redirecting a financial transaction according to various embodiments of the disclosure. At block 501, a card association (or any other entity involved in processing financial transactions) may receive from a card issuer (or any other entity involved in processing financial transactions) information for redirecting transactions, such as, for example, an old account number and a new account number. At block 502, the card association may determine whether the received information is valid and sufficient to allow it to redirect transactions in the future. For example, the information may be required to comprise two active and valid account numbers and an authorization code previously given to the submitting card issuer. If the information does not meet the necessary criteria, the card association may notify the submitting card issuer at block 503 in any of the ways described herein. If the information is valid and sufficient, the card association may at block 504 process the information by, for example, creating an entry in a table contained in an electronic database, as described herein. The card association may then at some point in time at block 505 receive information associated with a transaction to be redirected. For example, the card association may receive an authorization request from a merchant processor to authorize a purchase made by the customer using his or her old account number, as described herein. If the desired transaction is to be redirected (e.g., the account number used for the incoming transaction is in the table), the card association may then determine whether the transaction is valid at block 506. For example, the card association may verify that there may not have been a temporary or permanent hold placed on the card or verify that one or more predetermined fraud parameters may not have been triggered. In just one example, the card association may verify that the amount of the desired transaction is not unusually large based on the customer's recent purchases. If the desired transaction is determined to be invalid, the card association may notify the card issuer and/or customer at block 507 in any of the ways described herein. If the transaction is valid, the card association may process and route the information (e.g., an authorization request or a batch file for settlement) to the appropriate card issuer at block 508.

Figure 6:
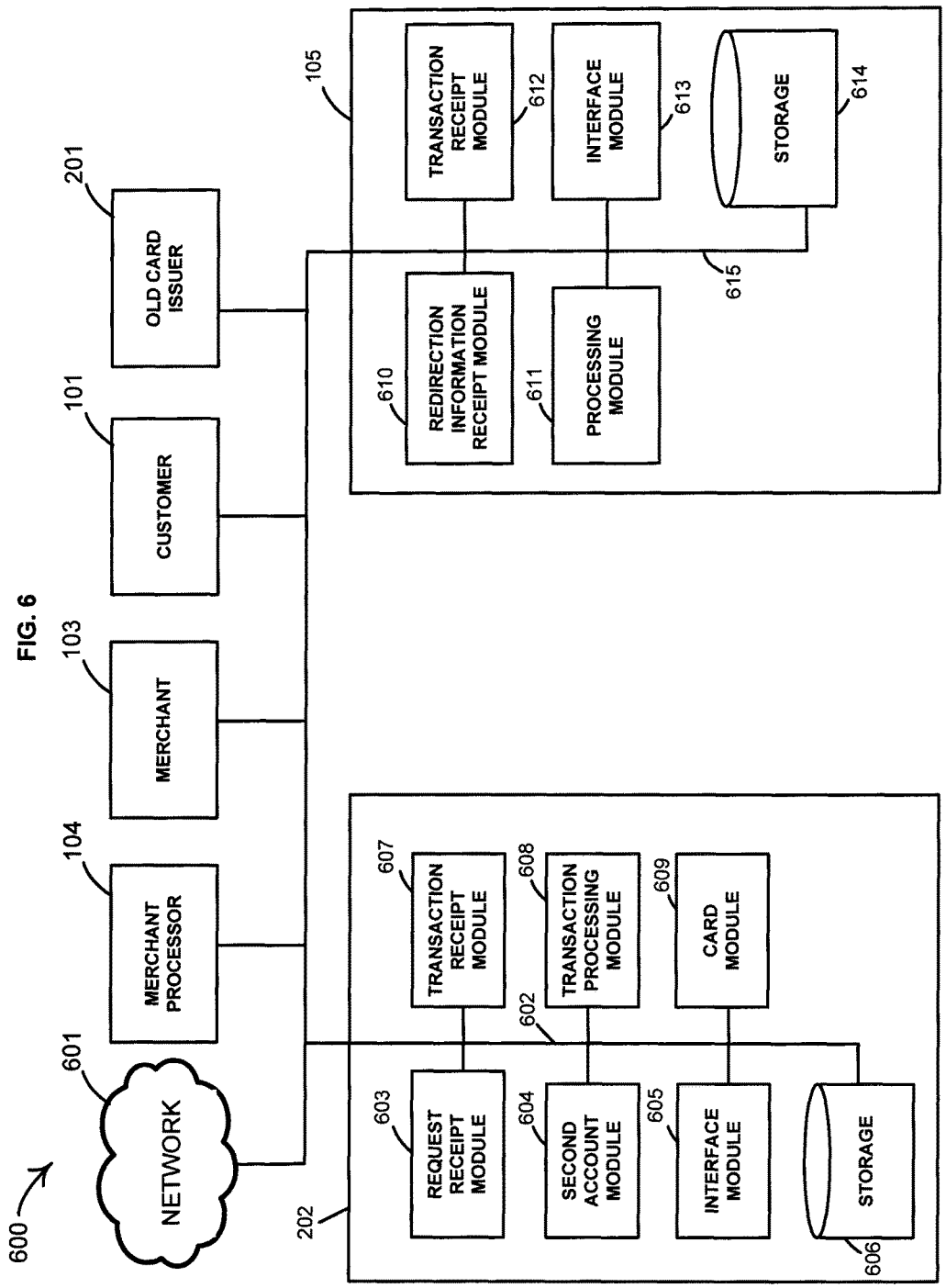
FIG. 6 depicts an exemplary system for redirecting a financial transaction according to various embodiments of the disclosure.

FIG. 6 depicts an exemplary system 600 for redirecting a financial transaction according to various embodiments of the disclosure. The new card issuer 202 may include one or more of the following modules: a request receipt module 603, a second account module 604, an interface module 605, a transaction receipt module 607, a transaction processing module 608, and a card module 609. One or more of the modules may electronically communicate with each other and/or other entities, such as, for example, the merchant processor 104, the merchant 103, the customer 101, the old card issuer 201, the card association 105, or any other entity over an external network 601, via a communication mechanism 602, such as a data communication bus or one or more networks as defined herein. The modules may also communicate with a storage mechanism 606, as described herein.

The card association 105 may include one or more of the following modules: a redirection information receipt module 610, a processing module 611, a transaction receipt module 612, and an interface module 613. One or more of the modules may electronically communicate with each other and/or other entities, such as, for example, the merchant processor 104, the merchant 103, the customer 101, the old card issuer 201, the new card issuer 202, or any other entity over an external network 601, via a communication mechanism 615, such as a data communication bus or one or more networks as defined herein. The modules may also communicate with a storage mechanism 614, as described herein.

The modules described in reference to FIG. 6 may each be an appropriately programmed computer, such as a mainframe or personal computer, or may include a plurality of such computers cooperating to perform the functionality described herein. The modules may also communicate with a storage mechanism 802, as described herein.

The request receipt module 603 may receive from a customer 101 or any other individual or entity a request to redirect a particular transaction(s), as described herein. The second account module 604 may identify an account to which the customer 101 desires transactions to be redirected. The second account module 604 may also create a new account at the new card issuer 202 to which transactions may be redirected if requested by the customer 101. The interface module 605 may provide information for redirecting transactions to an entity involved in processing transactions, such as the card association 105, as described herein. The transaction receipt module 607 may receive information associated with a particular transaction that was redirected to the new card issuer 202, as described herein. For example, the information may be an authorization request or a batch file for settlement. The transaction processing module 608 may perform the desired transaction with respect to the identified account (e.g., return an authorization message to the card association 105 or route funds to the card association 101, merchant 103, or other entity), as described herein. The card module 609 may also provide a card to the customer 101 if requested. The card may, for example, display the customer's old account number from the old card issuer 201 or the new account number at the new card issuer 202. In that way, the customer may be able to make purchases using the old account number until he or she receives a new card from the new card issuer 202. At that point, the customer 101 may continue or cancel the old account while having all transactions involving the old account redirected to the new account, as described herein. Also, the new card issuer 202 may store information associated with the customer 101, the account(s) of the customer 101, and any other information for redirecting transactions in a storage mechanism 606, such as an electronic database.

The redirection information receipt module 610 may receive information for redirecting transactions from an entity involved in processing transactions, such as the new card issuer 202, as described herein. The processing module 611 may process and store the information for future redirection of particular transactions. For example, the card association 105 may store information for redirecting transactions, such as a table of entries as described in reference to FIG. 3, in a storage mechanism 606. The transaction receipt module 612 may then receive information associated with a particular transaction that may need to be redirected to a particular entity, as described herein. For example, the information may be an authorization request or a batch file for settlement. The interface module 613 may provide that information to the correct entity (e.g., the new card issuer 202) in any of the ways described herein, such as over the communication mechanism 615.

The present invention provides a significant convenience to customers who desire to seamlessly switch accounts or switch account providers. For example, the customer may keep his or her old account number and need not manually change online accounts and automatic billing arrangements, which may save the customer money and time. The customer also need not remember all of the entities that have his or her account information on file and may simply make one request to a new card issuer to redirect all future transactions. In that way, the customer may avoid an interruption in service or overdue fees that may typically occur when the customer forgets to change his or her billing information with a particular entity. Also, a customer who finds a better account offer (e.g., a credit card offer) may find it much easier to switch from his or her current account provider.

By offering customers continuity of service, the present invention also encourages loyalty to the entity that allows a customer to redirect financial transactions. For example, a card issuer may give its customers a significant advantage over other providers that do not allow the same functionality, and thereby encourage its customers to open more accounts at the card issuer, which may increase the card issuer's business. A card issuer may also avoid overhead charges associated with manually attempting to redirect a transaction from one account to another if desired by a customer and may pass along these cost savings to its customers and thereby generate more business.

The embodiments of the present invention are not to be limited in scope by the specific embodiments described herein. For example, the customer may cancel his or her first account after instructing a card issuer to begin redirecting transactions, or may continue using the first account in circumstances where the desired transaction may not need to be redirected. Or, redirection information may be provided to any entity involved in processing transactions upon receipt of a request from a customer, periodically in batches, or in any other time interval. Or, the authorization request, authorization message, and batch files created and provided in a transaction may be in any form to permit authorization and settlement of a transaction. Or, the merchant may be located remotely from the customer and accessible to the customer via, for example, the telephone or one or more networks. Or, the system for redirecting a financial transaction may be a collection of more than one computer, each operating collectively as the system. Or, the system may be automated such that redirecting a financial transaction does not require interaction with an operator or a user. Thus, such modifications are intended to fall within the scope of the following appended claims. Further, although some of the embodiments of the present invention have been described herein in the context of a particular implementation in a particular environment for a particular purpose, those of ordinary skill in the art should recognize that its usefulness is not limited thereto and that the embodiments of the present invention can be beneficially implemented in any number of environments for any number of purposes. Accordingly, the claims set forth below should be construed in view of the full breadth and spirit of the embodiments of the present invention as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

The invention claimed is:

1. A computer-implemented method for redirecting a financial transaction comprising:

receiving, at a second issuer system via a network, a redirection request for redirecting a future financial transaction request in real-time away from a first account held by a customer at a first issuer system and to a second account held by the customer at the second issuer system, wherein the redirection request comprises a first account number associated with the first account, a second account identifier, and terms for the future financial transaction request, wherein the future financial transaction request comprises a payment request, and wherein the redirection request instructs the payment request away from the first account and to the second account using the first account number;

identifying, using the second issuer system, a second account number associated with the second account identifier based on the redirection request;

transmitting, from the second issuer system to a central gateway connected to the first issuer system via a first network and the second issuer system via a second network, redirection information to be used at the central gateway to generate a redirection entry that is stored in a redirection database connected to the central gateway, wherein the redirection information comprises the terms for the future financial transaction request, the first account number, and the second account number, and a plurality of batch files of all accumulated transactions;

facilitating a communication connection between the customer and the second issuer system via the central gateway;

receiving, at the second issuer system from the central gateway via a network, a redirected financial transaction request associated with the second account number, wherein the redirected financial transaction request is initiated at the central gateway based on the central gateway receiving a financial transaction request associated with the first account number used at a merchant system and the redirected financial transaction request is redirected from the central gateway to the second issuer system using the redirection entry such that the first account does not receive the financial transaction request;

processing, using the second issuer system, the redirected financial transaction request with respect to the second account using the second account number to approve or deny the redirected financial transaction request, such that the redirected financial transaction request is processed using the second account held by the customer rather than the first account held by the customer; and transmitting the approval or denial to the central gateway via a network for customer notification.

2. The method of claim 1, wherein identifying the second account number associated with the customer at the second issuer system further comprises creating, in real-time, the second account at the second issuer system.

3. The method of claim 1, wherein the second account identifier is a customer name.

4. The method of claim 1, wherein the redirection information is provided to the central gateway automatically at a predetermined time interval.

5. The method of claim 1, wherein the central gateway is maintained by a card association or a merchant.

6. The method of claim 1, wherein:
the first account is a prepaid card account, stored value card account, debit card account, check card account, payroll card account, gift card account, prepaid credit card account, charge card account, checking account, rewards account, line of credit account, or credit account, and
the second account is a prepaid card account, stored value card account, debit card account, check card account, payroll card account, gift card account, prepaid credit card account, charge card account, checking account, rewards account, line of credit account, or credit account.

7. The method of claim 1, wherein the redirected financial transaction request is a purchase, charge, cash advance, cash withdrawal, loan, payment, bill payment, debit, credit, deposit, or direct deposit.

8. The method of claim 7, wherein the redirected financial transaction request is an automatic financial transaction.

9. The method of claim 3, further comprising providing to the customer a card that displays the first account number or the second account number.

10. A second issuer system for redirecting a financial transaction, comprising:
a network interface connecting the second issuer system to a central gateway, wherein the central gateway is also connected to a first issuer system;
a request receipt module that when executed causes the second issuer system to receive, over a network, a redirection request for redirecting a future financial transaction request in real-time away from a first account held by a customer at the first issuer system and to a second account held by the customer at the second issuer system, wherein the redirection request comprises a first account number associated with the first account, a second account identifier, and terms for the future financial transaction request, wherein the future financial transaction request comprises a payment request, and wherein the redirection request instructs the payment request away from the first account and to the second account using the first account number;
a second account module that when executed causes the second issuer system to identify a second account number associated with the second account identifier based on the redirection request;
an interface module connected to the network interface that when executed causes the second issuer system to transmit redirection information to the central gateway over a network, wherein the redirection information is to be used at the central gateway to generate a redirection entry that is stored in a redirection database connected to the central gateway, and wherein the redirection information comprises the terms for the future financial transaction request, the first account number, and the second account number;
a transaction receipt module that when executed causes the second issuer system to receive a redirected financial transaction request associated with the second account number, wherein the redirected financial transaction request is initiated at the central gateway based on the central gateway receiving a financial transaction request associated with the first account number used at a merchant system and the redirected financial transaction request is redirected to the second issuer system from the central gateway using the redirection entry; and
a transaction processing module that when executed causes the second issuer system to:
process the redirected financial transaction request with respect to the second account using the second account number to approve or deny the redirected financial transaction request, such that the redirected financial transaction request is processed using the second account held by the customer rather than the first account held by the customer; and
transmit the approval or denial to the central gateway via a network for customer notification.

11. The system of claim 10, wherein, when executed, the second account module further causes the second issuer system to create the second account in real-time.

12. The system of claim 10, wherein the second account identifier is a customer name.

13. The system of claim 10, wherein the redirection information is provided to the central gateway automatically at a predetermined time interval.

14. The system of claim 10, wherein the central gateway is maintained by a card association or a merchant.

15. The system of claim 10, wherein:
the first account is a prepaid card account, stored value card account, debit card account, check card account, payroll card account, gift card account, prepaid credit card account, charge card account, checking account, rewards account, line of credit account, or credit account, and
the second account is a prepaid card account, stored value card account, debit card account, check card account, payroll card account, gift card account, prepaid credit card account, charge card account, checking account, rewards account, line of credit account, or credit account.

16. The system of claim 10, wherein the redirected financial transaction request is a purchase, charge, cash advance, cash withdrawal, loan, payment, bill payment, debit, credit, deposit, or direct deposit.

17. The system of claim 16, wherein the redirected financial transaction request is an automatic financial transaction.

18. The system of claim 12, further comprising a card module that when executed causes the second issuer system to issue a card that displays the first account number or the second account number.

19. A non-transitory computer-accessible medium encoded with computer program code effective to perform the following:
receive, at a second issuer system via a network, a redirection request for redirecting a future financial transaction request in real-time away from a first account held by a customer at a first issuer system and to a second account held by the customer at a second issuer system, wherein the redirection request comprises a first account number associated with the first account, a second account identifier, and terms for the future financial transaction request, wherein the future financial transaction request comprises a payment request, and wherein the redirection request instructs the payment request away from the first account and to the second account using the first account number;
identify, at the second issuer system, a second account number associated with the second account identifier based on the redirection request;
transmit redirection information, from the second issuer system to a central gateway connected to the first issuer system via a first network and the second issuer system via a second network, wherein the redirection information is to be used at the central gateway to generate a redirection entry that is stored in a redirection database connected to the central gateway, wherein the redirection information comprises the terms of the future financial transaction request, the first account number, and the second account identifier;
receive, from the central gateway via a network, a redirected financial transaction request associated with the second account number, wherein the redirected financial transaction request is initiated at the central gateway based on the central gateway receiving a financial transaction request associated with the first account number used at a merchant system and the redirected financial transaction request redirected to the second issuer system from the central gateway using the redirection entry;
process, using the second issuer system, the redirected financial transaction request with respect to the second account using the second account number to approve or deny the redirected financial transaction request, such that the redirected financial transaction request is processed using the second account held by the customer rather than the first account held by the customer; and
transmit, from the second issuer system via a network, the approval or denial to the central gateway for customer notification.

20. A computer-implemented method for redirecting a financial transaction comprising:
receiving, at a central gateway connected to a first issuer system via a first network and a second issuer system via a second network, redirection information from a second issuer system for redirecting a future financial transaction request in real-time away from a first account held by a customer at the first issuer system and to a second account held by the customer at the second issuer system such that the future financial transaction request is processed in real-time with respect to the second account held by the customer wherein the redirection information comprises a first account number associated with the first account, a second account number associated with the second account, and terms for the future financial transaction request, wherein the future financial transaction request comprises a payment request, and wherein the redirection information instructs the payment request away from the first account and to the second account using the first account number;
generating, using a processor at the central gateway, a redirection entry that is stored in a redirection database connected to the central gateway, wherein the redirection entry comprises the first account number associated with the first account, the second account number associated with the second account, and the terms for the future financial transaction request associated with the redirection information;
receiving, at the central gateway via a network, a transaction request associated with the first account number from a merchant system, wherein the transaction request comprises a transaction amount;
converting, using a processor at the central gateway, the transaction request to a redirected transaction request using the redirection entry, wherein the redirected transaction request comprises the second account number, and the transaction amount, such that the first account does not receive the transaction request;
transmitting, from the central gateway via a network, the redirected transaction request to the second issuer system; and
receiving, from the second issuer system via a network, an approval or denial of the redirected transaction request to return to the merchant system.

21. The method of claim 20, wherein the terms for the future financial transaction request comprises a redirection time period and a transaction type.

22. The method of claim 20, wherein the redirection information is received automatically at a predetermined time interval.

23. The method of claim 20, wherein the transaction request is a purchase, charge, cash advance, cash withdrawal, loan, payment, bill payment, debit, credit, deposit, or direct deposit.

24. The method of claim 23, wherein the transaction request is an automatic financial transaction.

25. A central gateway for redirecting a financial transaction comprising:
a first network connection to a first issuer system;
a second network connection to a second issuer system;
a redirection information receipt module that when executed causes the central gateway to receive, from the second issuer system over a network, redirection information for redirecting a future financial transaction request in real-time away from a first account held by a customer at the first issuer system and to a second account held by the customer at the second issuer system such that the future financial transaction request is processed in real-time with respect to the second account held by the customer, wherein the redirection information comprises a first account number associated with the first account, a second account number associated with the second account, and terms for the future financial transaction request, wherein the future financial transaction request comprises a payment request, and wherein the redirection information instructs the payment request away from the first account and to the second account using the first account number;
a processing module that when executed causes the central gateway to:
generate a redirection entry that is stored in a redirection database connected to the central gateway, wherein the redirection entry comprises the first account number associated with the first account, the second account number associated with the second account, and the terms for the future financial transaction request;
a transaction receipt module that when executed causes the central gateway to receive a transaction request from a merchant system, wherein the transaction request comprises the first account number and a transaction amount; and
an interface module that when executed causes the central gateway to redirect the financial transaction by:
converting the transaction request to a redirected transaction request using the redirection entry, wherein the redirected transaction request comprises the second account number and the transaction amount;
transmitting, to the second issuer system via a network, the redirected transaction request; and
receiving, from the second issuer system via a network, an approval or denial of the redirected transaction request to return to the merchant system.

26. A non-transitory computer-accessible medium encoded with computer program code effective to perform the following:
receive, at a central gateway connected to a first issuer system via a first network and a second issuer system via a second network, redirection information from the second issuer system for redirecting a future financial transaction request in real-time away from a first account held by a customer at a first issuer system and to a second account held by the customer at the second issuer system such that the future financial transaction request is processed solely by the second account held by the customer,
wherein the redirection information comprises a first account number associated with the first account, a second account number associated with the second account, and terms for the future financial transaction request, wherein the future financial transaction request comprises a payment request, and wherein the redirection information instructs the payment request away from the first account and to the second account;
generate, using a processor at the central gateway, a redirection entry that is stored in a redirection database connected to the central gateway, wherein the redirection entry comprises the first account number associated with the first account, the second account number associated with the second account, and the terms for the future financial transaction request associated with the redirection information;
receive, at the central gateway via a network, a transaction request associated with the first account number from a merchant system, wherein the transaction request comprises a transaction amount;
convert, using a processor at the central gateway, the transaction request to a redirected transaction request using the redirection entry, wherein the redirected transaction request comprises the second account number and the transaction amount;
transmit, from the central gateway via a network, the redirected transaction request to the second issuer system; and
receive, from the second issuer system via a network, an approval or denial of the redirected transaction request to return to the merchant system.

* * * * *